United States Patent

[11] 3,604,690

| [72] | Inventor | Knut Rude Traelnes<br>Yverdon, Switzerland |
|---|---|---|
| [21] | Appl. No. | 885,685 |
| [22] | Filed | Dec. 17, 1969 |
| [45] | Patented | Sept. 14, 1971 |
| [73] | Assignee | Societe d'Assistance Technique Pour<br>Produits Nestle S.A.<br>Lausanne, Switzerland |
| [32] | Priority | Dec. 24, 1968 |
| [33] | | Great Britain |
| [31] | | 61354/68 |

[54] AGITATION SYSTEM
7 Claims, 5 Drawing Figs.

| [52] | U.S. Cl. | 259/107 |
|---|---|---|
| [51] | Int. Cl. | B01f 7/16 |
| [50] | Field of Search | 259/107,<br>108, 95, 102, 96, 7, 5–10, 16, 21–26, 32–34,<br>40–46, 64–71 |

[56] References Cited
UNITED STATES PATENTS

| 1,995,465 | 3/1935 | Bigelow et al. | 259/108 |
| 2,590,431 | 3/1952 | Rose | 259/108 X |
| 3,044,750 | 7/1962 | Schmitt | 259/108 X |
| 3,139,917 | 7/1964 | Elmore | 259/107 X |

*Primary Examiner*—Jordan Franklin
*Assistant Examiner*—Geo. V. Larkin
*Attorney*—Watson, Leavenworth & Kelton ABSTRACT: An agitation device for vessels containing a liquid, for example fermenters, comprises at least one rotatable disc having a serrated perimeter, an axial impeller concentric with the disc and at least one baffle cooperable with the serrated edge of the disc arranged to generate zones of shear in the liquid as the disc rotates.

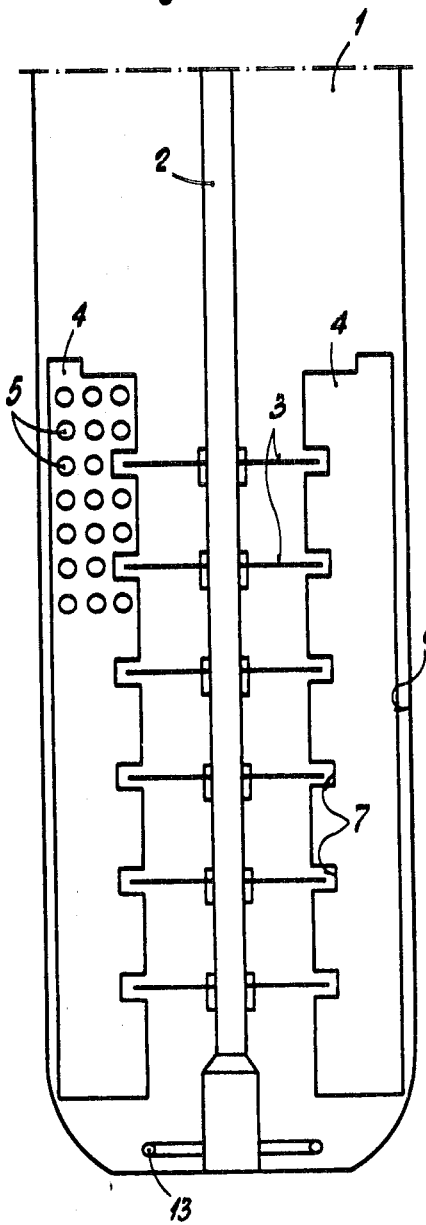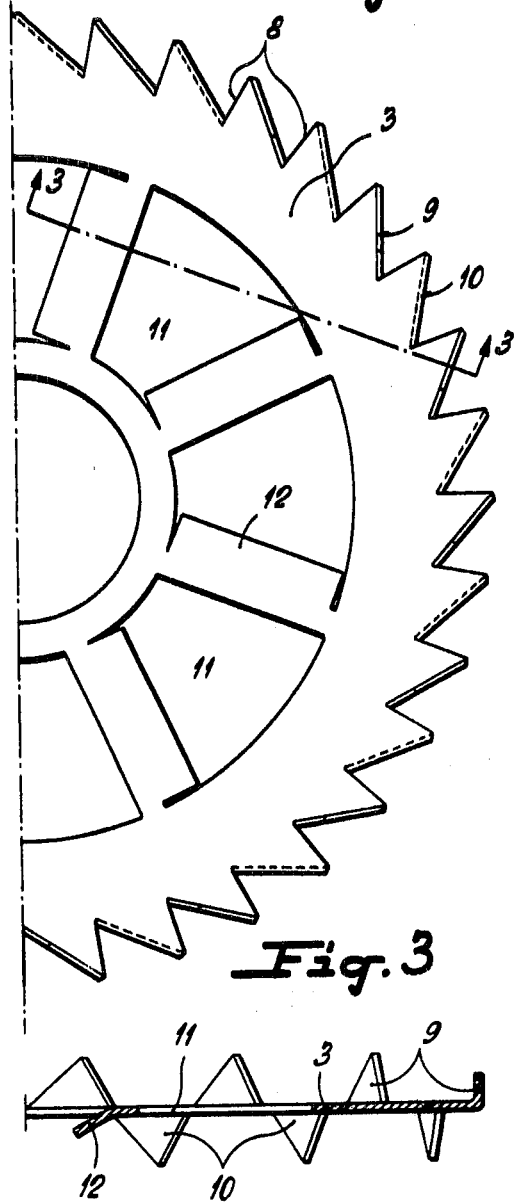

AGITATION SYSTEM

The present invention concerns a high-efficiency agitation system for liquids. It is especially intended to provide efficient mixing of solutions in which more than one phase is present, e.g. in which immiscible liquids are intimately mixed or in which a gas is dispersed in a liquid. It is particularly useful in fermentation vessels used for aerobic fermentation in which oxygen or air is passed into an aqueous solution, at a relatively low reaction temperature. To obtain a rapid reaction it is necessary to disperse the gas in the solution as very small bubbles to provide a large interface between the gas and the solution, allowing rapid dissolution of the gas.

When the liquid solution comprises more than one liquid phase, as is the case when micro-organisms are cultivated in an aqueous fermentation broth containing a hydrocarbon substrate, it is also necessary to intimately disperse the immiscible liquid phases.

Various types of stirrer are known which are capable of achieving efficient dispersion on a large scale, but they are all characterized by poor efficiency at high power inputs. The cost of the power absorbed as well as the capital cost of the driving means, generally an electric motor, is quite high and significantly affects the cost of such processes. This cost factor is particularly important when large quantities of a product are prepared from dilute solutions by a relatively slow reaction.

It is therefore an object of the present invention to provide an agitation device for a liquid which gives efficient dispersion of different phases in the liquid with an efficient utilization of the power supplied to the system.

The agitation device according to the invention is characterized in that it comprises a rotatable disc having a serrated perimeter, an axial impeller concentric with the disc and at least one baffle cooperable with the serrated perimeter of the disc to generate zones of shear in the liquid as the disc rotates.

The sawtooth edge of the serrated disc is advantageously provided with a flange on the edge of each serration, the flanges hence being at an oblique angle relative to the axis of rotation of the disc. The flanges on adjacent serrations are preferably perpendicular to the plane of the disc and arranged on opposite sides thereof. In operation the disc is mounted to rotate below the liquid surface in a vessel, and one or more baffles are positioned in the vessel having a surface adjacent the serrations to provide a shearing action in the liquid at the serrations as the disc rotates. As the speed of rotation of the disc is progressively increased greater turbulence is produced adjacent the baffles, breaking up large gas bubbles and mixing different liquid phases and suspended solid components in the solution.

The baffles may be of any known type but they advantageously comprise longitudinal plates arranged radially with respect to the axis of rotation of the disc and extending from the wall of the vessel to the disc periphery. The baffles are preferably perforated to induce turbulence as the liquid passes through the holes.

The serrations at the perimeter of the disc produce considerable radial flow and good mixing at the periphery but provide little movement of the liquid parallel to the axis of rotation.

In order to obtain good bulk mixing, the agitation device according to the invention is provided with an axial impeller mounted concentric with the disc and the impeller advantageously comprises inclined paddle blades pressed out of the center portion of the disc. As the disc rotates, the liquid is impelled by the inclined blades through the holes formed by pressing out the blades and so a bulk liquid circulation is generated. The amount of circulation generated and the power requirements for the blades are determined by their size and angle of inclination.

When large volumes of liquid are to be handled in large vessels, several agitators of the type described above may be mounted on and driven by the same shaft. In large industrial vessels the shaft is generally vertical and may be driven from the top of the vessel.

A preferred embodiment of the invention is now described, by way of example only, with reference to the accompanying drawings, in which:

FIG. 1 shows schematically a vertical section of a fermenter vessel containing the agitation device;

FIG. 2 shows a plan view of one of the elements 3 in FIG. 1;

FIG. 3 is a cross section along line 3—3 of FIG. 2.

Figure 4:
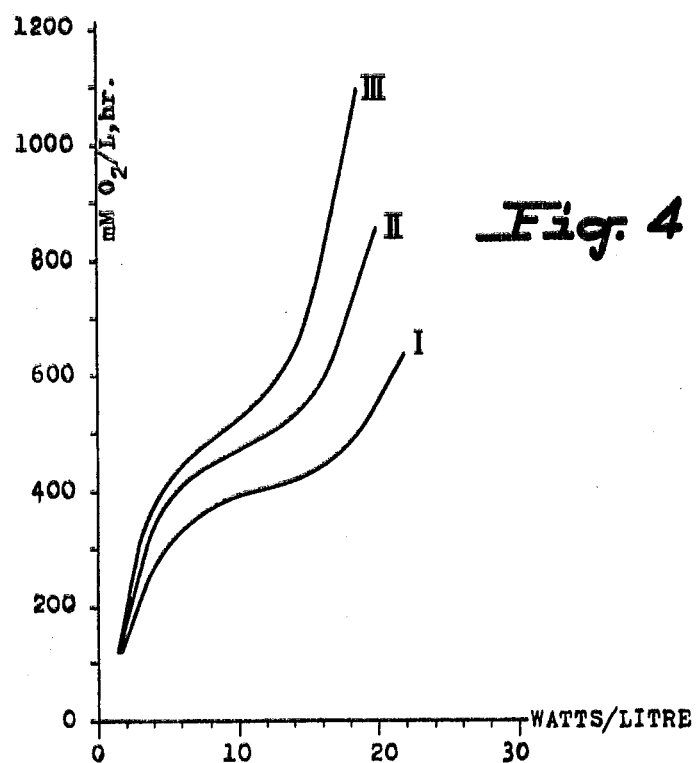
FIGS. 4 and 5 are oxygen-absorption curves, as obtained by measuring the amount of oxygen absorbed by a sulfite solution as a function of the power input for the agitation device of the present invention and a conventional vaned disc impeller, respectively. Curves I, II and III respectively are plotted for different air inputs to the vessel.

As shown in FIG. 1, a generally vertical cylindrical fermentation vessel 1 has a rotatable vertical shaft 2 mounted therein carrying a series of serrated discs 3. When driven by the shaft, each disc rotates in a horizontal plane. Surrounding the shaft and supported within the vessel are a number of radially arranged vertical baffle plates 4. The plates 4 extend inwards from the fermenter wall 6 and have perforations 5 and a series of notches 7. In each notch 7 is disposed the peripheral portion of one of said discs 3. Air for an aerobic fermentation reaction is injected into the vessel through the sparger 13.

The detailed structure of the discs 3 is shown in FIG. 2. At the edge of each disc, made from a single sheet of metal, are a series of 36 serrations forming a sawtooth edge to the disc. The serrations may be asymmetric. The disc is cut to form one edge 8 of each serration and the oblique segments between the cuts are bent towards either side of the disc alternately to form flanges 9 and 10 as shown in FIG. 3.

When the disc shown in FIG. 2 rotates clockwise, within the fermenter, the effect of the flanges 9 and 10 as they pass through the notches 7 is to create zones of shear adjacent the serrations. This effect increases with the speed of rotation.

In addition to the turbulence generated at the serrations, considerable turbulence is also generated at the perforations in the baffles so that the mixing and dispersing effect is further increased.

To produce axial movement of the liquid, the center portion of each disc comprises apertures 11 in which extend pitched impeller blades 12, shown in section in FIG. 3. These blades are pressed out of the disc so that each blade has a corresponding gap in the disc. The dimensions of the blades and the angle subtended by the blades with the plane of the disc are determined by the amount of axial displacement required for a given speed of rotation and hence for a given power input. In the present embodiment there are eight blades pitched at an angle of 30°, this angle giving mainly axial flow and relatively little radial flow.

Figure 5:
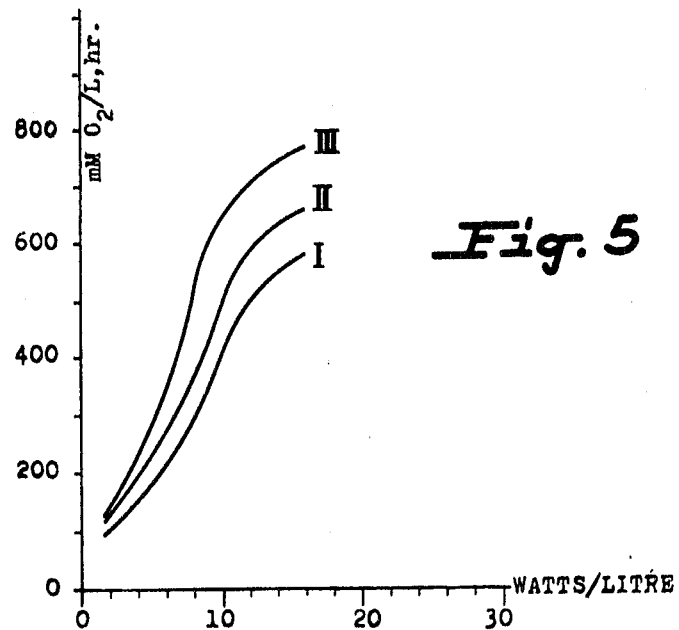

To illustrate the improved efficiency of this type of agitation device over conventional impellers, FIG. 4 shows the amount of oxygen absorbed by a sulfite solution in the fermenter for different power inputs and different feed rates of air using an agitation device of the type described above. FIG. 5 shows the results of the same type of trial in the same fermenter vessel holding the same volume of solution but using a conventional vaned disc impeller.

The oxygen absorbed, measured by standard methods and given as millimoles/hour/liter of solution, is plotted as ordinate and the power input given as watts/liter of solution is plotted as abscissa after deducting bearing losses. Curves I, II and III respectively are plotted for a constant rate of air feed to the solution of 0.91, 1.52 and 2.48 liters per minute per liter of solution.

The curves demonstrate that at a high-power input and high aeration rate a much greater rate of oxygen absorption is obtained using the serrated disc impeller.

I claim:

1. Apparatus for agitating a liquid comprising a vessel for receiving the liquid, said vessel including an encircling wall, a shaft rotatable within said vessel, a disc mounted on said shaft for rotation therewith about a common axis, said disc having a series of serrations extending around the perimeter thereof, each of said serrations having an edge provided with a flange disposed inclined relative to said common axis of rotation, the flanges on adjacent serrations being positioned on opposite sides of said serrated disc, a plurality of pitched impeller blades fixed with said serrated disc and located intermediate said serrations and the center of said serrated disc, and at least one baffle in said vessel extending inwardly of the wall of said vessel and adjacent to the perimeter of said disc, said baffle having at least one notch therein through which the flanges on said serrations pass in spaced relationship to said notch when said disc is rotated, producing shearing forces in the liquid adjacent said serrations.

2. The apparatus of claim 1 wherein said flanges are positioned perpendicular to the plane of said serrated disc.

3. The apparatus of claim 1 wherein said baffle is an elongated plate extending longitudinally of said vessel and parallel with said shaft.

4. The apparatus of claim 3 wherein said baffle is provided with a plurality of perforations therein through which the liquid can pass during agitation thereof to induce turbulence in said liquid.

5. The apparatus of claim 1 comprising a plurality of discs on said shaft, each baffle having a corresponding plurality of notches therein through which the flanges on the serrations of the respective discs pass when said discs are rotated.

6. The apparatus of claim 5 wherein plural baffles are provided, said baffles being circularly spaced about said common axis.

7. The apparatus of claim 6 wherein four baffles are provided, said baffles being uniformly circularly spaced about said common axis.